United States Patent [19]
Oda et al.

[11] 3,985,866
[45] Oct. 12, 1976

[54] METHOD OF PRODUCING HIGH-PRESSURE HYDROGEN CONTAINING GAS FOR USE AS A POWER SOURCE

[75] Inventors: Noriyuki Oda; Takashi Yoshida; Takeshi Nakanishi; Kensuke Yoshikawa; Akira Adachi; Jitsuhiko Ueda; Toshihiro Mizota, all of Osaka, Japan

[73] Assignee: Hitachi Shipbuilding and Engineering Co., Ltd., Osaka, Japan

[22] Filed: May 15, 1975

[21] Appl. No.: 577,817

[30] Foreign Application Priority Data
Oct. 7, 1974 Japan............................ 49-115794
Dec. 9, 1974 Japan............................ 49-141714

[52] U.S. Cl. .............................................. 423/657
[51] Int. Cl.² ............................................ C01B 1/08
[58] Field of Search ........... 423/657, 499, 278, 625, 423/627

[56] References Cited
UNITED STATES PATENTS

| | | | |
|---|---|---|---|
| 883,531 | 3/1908 | Foersterling et al. | 423/657 |
| 909,536 | 1/1909 | Brindley | 423/657 X |
| 3,540,854 | 11/1970 | Brooke, Jr. et al. | 423/657 X |
| 3,821,362 | 6/1974 | Spacil | 423/657 |
| 3,839,550 | 10/1974 | Wentorf, Jr. | 423/657 X |
| 3,932,600 | 1/1976 | Gutbier et al. | 423/657 |

FOREIGN PATENTS OR APPLICATIONS 14,269  3/1898  United Kingdom............ 423/657

OTHER PUBLICATIONS

Hackh's Chem. Dictionary, 4th Ed., Revised, 1969, p. 401, McGraw-Hill Book Co., N.Y.
J. W. Mellor's "A Comprehensive Treatise on Inorganic and Theo. Chem.," vol. 5, 1924, pp. 205, 217, 218.

*Primary Examiner*—Edward Stern
*Attorney, Agent, or Firm*—Allison C. Collard

[57] ABSTRACT

Method in which a metal fuel in the form of molten droplets is brought into contact with water for reaction. The fuel comprises aluminum as a primary fuel component and at least one of lithium, magnesium, sodium, potassium and sodium-potassium alloy as an auxiliary fuel component and is used in the form of an alloy or a mixture of these fuel components. When used in the form of an alloy, the fuel is preheated to a molten state and injected into a reactor under high pressure, whereby the fuel is made into droplets and contacted with water vapor introduced into the reactor from another system. For use as a mixture, the fuel is made into a slurry the liquid phase of which consists singly of the auxiliary fuel component, and the slurry is injected into an atmosphere containing water vapor.

7 Claims, 5 Drawing Figures

METHOD OF PRODUCING HIGH-PRESSURE HYDROGEN CONTAINING GAS FOR USE AS A POWER SOURCE

BACKGROUND OF THE INVENTION

The present invention relates to a method of producing a high-pressure gas, and more particularly to a method of making a high-pressure gas for use as driving energy for turbines to propel small-sized self-propelling submarine bodies.

As a method of obtaining a power for propelling small-sized submarine bodies, it is known to use metals as fuels, especially aluminum which releases a large amount of heat per unit volume and which is available at a relatively low cost. With this method, molten aluminum is reacted with water as represented by the following equation to give a high-pressure gas.

$$2Al + 3H_2O \rightarrow Al_2O_3 + 3H_2$$

Although this method is generally considered to be advantageous, the alumina ($Al_2O_3$) resulting from the above reaction immediately covers the surface of aluminum to inhibit the reaction if the reaction temperature is low, so that it is reportedly impossible to permit continuous reaction unless the reaction system is maintained at a high temperature of at least 2,318° C, the melting point of alumina. In practice, however, extreme difficulties are encountered in maintaining the reaction system at such a high temperature, consequently making the method still-infeasible in spite of the advantage resulting from the use of aluminum fuel.

SUMMARY OF THE INVENTION

The object of this invention is to overcome the problem described above and to provide a method of efficiently producing a high-pressure gas using a fuel consisting predominantly of aluminum.

This invention provides a method of producing a high-pressure gas by contacting a metal fuel in the form of molten droplets with water, characterized in that the metal fuel comprises aluminum as a primary fuel component and at least one metal selected from the group consisting of alkali metals and alkaline earth metals and serving as an auxiliary fuel component for assisting in the reaction.

The metal fuel is in the form of an alloy of the primary fuel component, namely aluminum, and the auxiliary fuel component such as lithium or magnesium. Alternatively, the metal fuel is in the form of a uniform mixture of finely divided aluminum and at least one of sodium, potassium, sodium-potassium alloy, etc. serving as the auxiliary fuel component. In either of the above-mentioned forms, the auxiliary fuel component facilitates the reaction between the fuel and water, assuring stable and uninterrupted reaction to continuously generate a high-pressure gas without the necessity of heating the reaction system from outside to maintain the system at the aforementioned high temperature.

The present invention will be described below in greater detail with reference to the accompanying drawings.

DESCRIPTION OF THE PREFERRED EMBODIMENTS

The fuel to be used in the high-pressure gas producing method of this invention is in the form of an alloy or mixture of metals. These two cases will be described below in detail.

I. Use of alloy fuel

The fuel is in the form of an alloy comprising aluminum and one metal selected from the group consisting of alkali metals and alkaline earth metals. The alloy fuel is heated to a molten state and then injected through a nozzle into a reactor in the form of droplets. The droplets of the fuel are brought into contact with water vapor injected into the reactor from another system to yield a high-pressure gas.

The alkali metals and alkaline earth metals serving as auxiliary fuel components assist in the reaction between the fuel and water to improve the degree of reaction. The metals usable for this purpose must fulfil the requirements of: (a) being capable of forming an alloy of an appropriate composition in combination with aluminum, (b) having the properties to attack the alumina film resulting from the reaction and (c) being itself reactive with water at high temperatures. Preferably, they further have the following characteristics: (d) being reactive with water also at low temperatures, (e) being highly exothermic when reacted with water, (f) giving no deleterious effect with its reaction product to the use of the evolved gas as the working fluid for propulsion, (g) having a lower melting point than aluminum when made into an aluminum alloy and (h) being easily available at a low cost.

In view of these requirements and desirable characteristics, aluminum alloys prepared using various metal elements in the above-mentioned metal group were subjected to reaction test, with the result that aluminum alloys containing lithium or magnesium were found to be most suitable. More specifically, use of lithium or magnesium has the advantage of reducing the melting point of the fuel. For example, an aluminum alloy containing 5% by weight of lithium starts to melt at 598° C, and an aluminum alloy containing 35% by weight of magnesium starts to melt at about 450° C, whereas pure aluminum has a melting point of 660° C. Accordingly, the heating temperature for melting the fuel is settable at a lower level, thus affording greater freedom to the selection of material of the fuel container in the combustor by fulfilling the requirement that the container be used preferably at low temperatures. Use of aluminum alloy containing lithium or magnesium has another advantage that it becomes easy to overcome the problem owing to the deposition of the reaction product on the wall of the combustor. Both lithium and magnesium react with water more readily than aluminum, giving lithium hydroxide and magnesium hydroxide respectively. Since these compounds are softer than alumina, the problem resulting from the deposition of such reaction product on the wall of the combustor can be overcome with much greater ease than when alumina alone is formed.

Figure 1:
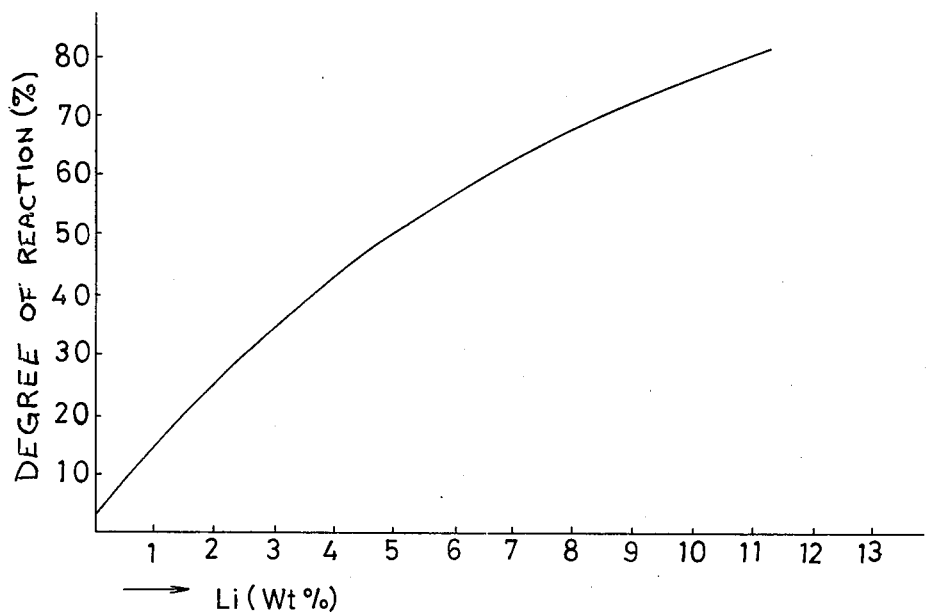
FIG. 1 is a graph showing the relationship between the degree of reaction and the lithium content of aluminum-lithium alloy fuel.
Figure 2:
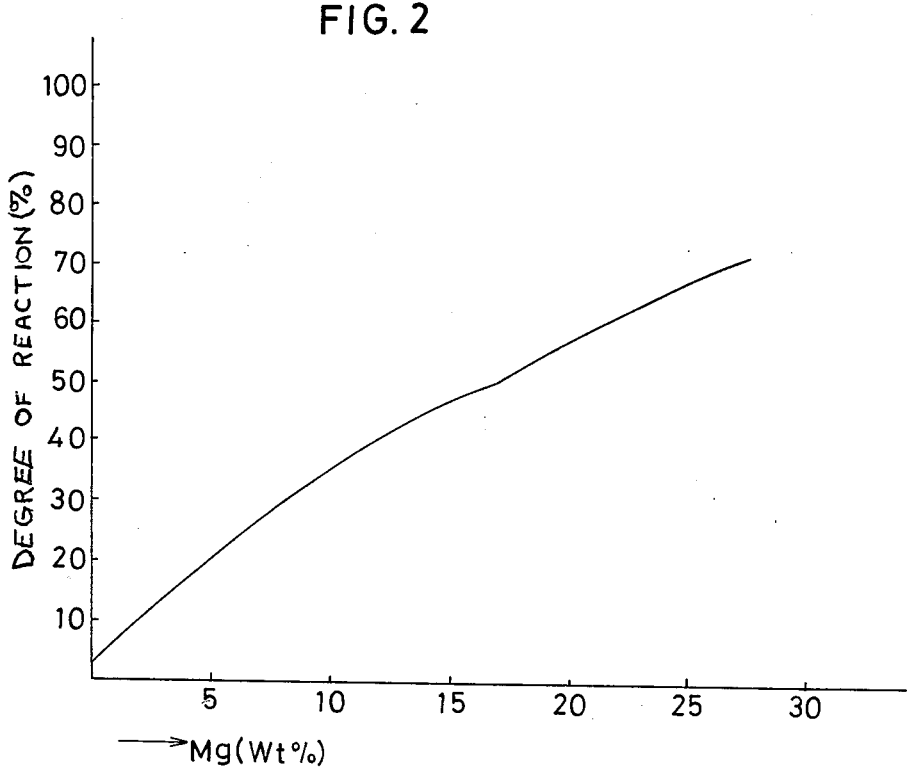
FIG. 2 is a graph showing the relationship between the degree of reaction and the magnesium content of aluminum-magnesium alloy fuel.
Figure 3:
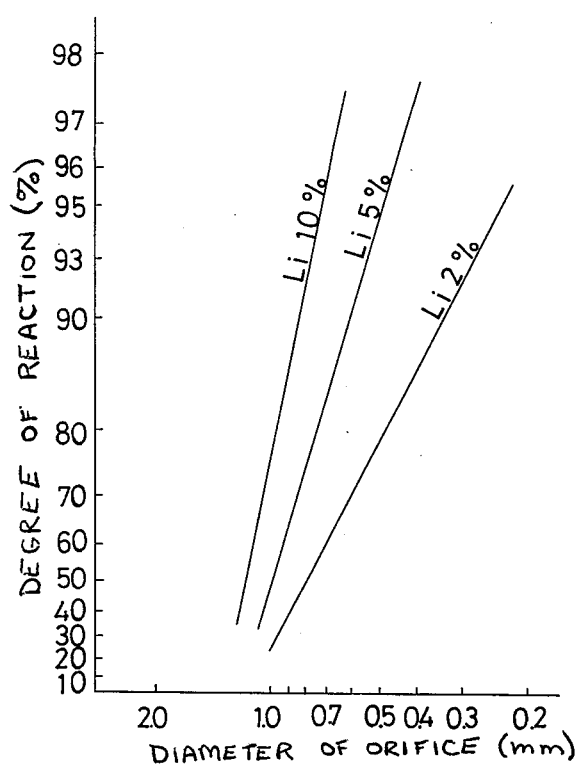
FIG. 3 is a graph showing the relationship between the degree of reaction and the diameter of orifice of a fuel injection nozzle when an aluminum-lithium alloy fuel is used.
Figure 4:
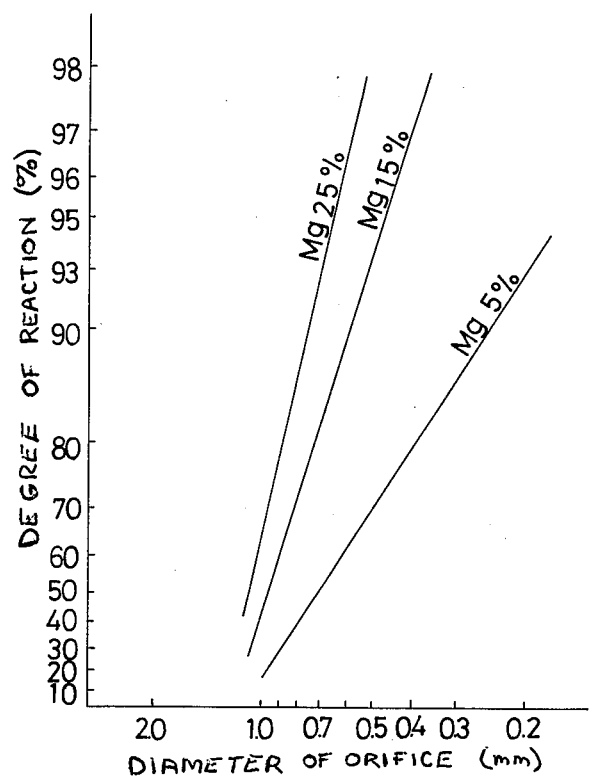
FIG. 4 is a graph showing the relationship between the degree of reaction and the diameter of orifice of a fuel injection nozzle when an aluminum-magnesium alloy fuel is used.

The degree of reaction of alloy fuel is largely dependent on the composition of the fuel and on the size of nozzle orifice for injecting the fuel. FIGS. 1 and 2 show the relationship between the reaction degree and alloy composition with molten lithium-aluminum alloy and magnesium-aluminum alloy are each injected into water at high pressure from a nozzle measuring 1 mm in the diameter of its orifice, whilst FIGS. 3 and 4 show the relationship between the degree of reaction and the diameter of orifice of the fuel injection nozzle.

These drawings show that the higher the lithium or magnesium content of the fuel, the higher will be the degree of reaction achieved and that when the amount of such metal is small, a high degree of reaction is attainable if the orifice size of the injection nozzle is reduced. However, nozzles having very small orifice diameters of not larger than 0.2 mm are not suitable for practical use, because they are difficult to make and require high pressure for the injection of fuel, entailing the necessity to use a fuel container which is resistant to superhigh pressure. Accordingly, the orifice diameter of the nozzle is usually 0.3 to 1.0 mm, preferably about 0.5 to 0.6 mm. It will be understood from FIGS. 3 and 4 that for a fuel injection nozzle having an orifice diameter of about 0.6 mm, the aluminum alloy fuel must contain at least 5% of lithium or at least 15% of magnesium.

To inject the alloy fuel from the nozzle in the form of the desired droplets, it is critical to heat the fuel to a temperature at least 20° C higher than its melting point. However, in order to permit the lowest possible operating temperature for the fuel container, it is disadvantageous to heat the fuel to a temperature more than about 200° C higher than the melting temperature of the fuel, so that in practice, it is preferable to set the heating temperature about 50° to 150° C higher, preferably about 100° C higher, than the melting point.

The means for heating the alloy fuel to the above-mentioned temperature is suitably selectable in connection with the purpose for which the evolved gas is used. Although the fuel container can be heated from outside electrically or with the combustion heat of some other usual fuel, the present method, when applied to the generation of propulsive power for submarine self-propelling body, involves the necessity to instantaneously melt the fuel and to thereby afford the self-propelling body instant readiness for high-speed propulsion. One of the preferred fuel heating means meeting this necessity is use of the reaction heat of a heat generating material comprising a mixture of boron and potassium perchlorate. The reaction is represented by the following equation:

$$8B + 3KClO_4 \rightarrow 4B_2O_3 + 3KCl + 1,209.7 \text{ Kcal.}$$

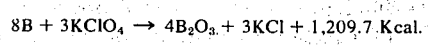

The heat generating material is placed in the fuel container as uniformly admixed with the fuel and is ignited, for example, by an electric igniter to give off the reaction heat for heating the metal fuel. For convenience in admixing the heat generating material with the fuel, it is advantageous to add wax or like additive to powdery boron and potassium perchlorate and shaping the mixture to pellets about 3 mm in diameter. Such means for heating the fuel in the interior of the fuel container has the advantage that the reaction heat of the heat generating material can be most efficiently utilized to melt the fuel. In addition, the heat generating material is advantageous to use in that the exothermic reaction evolves almost no gas, obviating the possible damage to the fuel container. Furthermore because the reaction products have low melting points, namely 557° C for $B_2O_3$ and 776° C for KCl, which are lower than the temperature of the injected fuel which is usually about 800° C, the heat generating material has another advantage that the reaction products are in molten state when the fuel is injected and are unlikely to clog up the nozzle.

The heat of reaction of a heat generating material comprising a mixture of aluminum and metal oxide is also usable as another effective means for heating the fuel. Preferred examples of the metal oxides are iron oxide and copper oxide. When used for this purpose, iron oxide undergoes the following reaction:

$$Fe_2O_3 + 2Al \rightarrow Al_2O_3 + 2Fe + 880 \text{ Kcal/kg.}$$

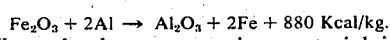

When the heat generating material is used in the interior of the fuel container, the reaction products are liable to block up the fuel injection nozzles, so that is is used outside the fuel container. When ignited, the material gives off reaction heat, which is transmitted through the wall of the fuel container into the interior thereof to melt the fuel. Since the reaction of the heat generating material does not generate a gas, the material has the advantages that the reaction heat is effectively usable for melting the fuel without permitting the heat to escape with gas and that the otherwise likely damage to the fuel container is avoidable.

The water to be used for the reaction of the fuel is injected into the reaction through a nozzle having nearly the same orifice diameter as the fuel injection nozzle. Thus injected, the particles of water impinge on the droplets of the molten metal fuel, causing the foregoing reaction. Although the impurities which are likely to block up the nozzle must be separated off from the water as by filtration, usual dissolved matters are not objectionable. Seawater is also usable.

EXAMPLE 1

Figure 5:
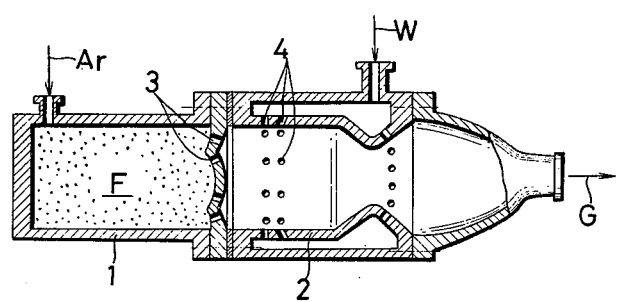
FIG. 5 is a schematic view in vertical section showing an example of the apparatus for practicing this invention.

An alloy comprising 93% of aluminum and the balance lithium was used as a fuel F in the apparatus shown in FIG. 5. The fuel F was filled in a pressure-resistant fuel container 1 and heated to a molten state at 600° C with an electric heater, and the interior of the fuel container 1 was then pressurized to 5 kg/cm² with argon gas. The molten fuel was injected into a reactor 2 through injection nozzles 3 each measuring 0.5 mm in the orifice diameter. At the same time, water W was injected into the reactor 3 under pressure through a number of nozzles 4 each having an orifice 0.5 mm. in diameter and was brought into contact with droplets of the fuel, whereby the fuel F was vigorously reacted with the water W within the reactor 2, giving a large amount of high-pressure high-temperature gas G. At least 90% of the fuel F reacted.

II. Use of fuel in the form of a mixture

In this case it is critical to use aluminum as finely divided to the smallest possible extent, i.e., to particle sizes of up to several tens of microns, so as to ensure instantaneous complete combustion upon contact with water. The smaller the particle size, the higher will be the degree of reaction, but in practice, it is usually about 10 to 20 microns in view of availability.

The auxiliary fuel component to be admixed with finely divided aluminum to constitute a fuel must have the characteristics of being lower melting than aluminum to the greatest possible extent and capable of vigorously reacting with water in molten state, liberating sufficient heat to maintain the reaction temperature of aluminum for continuous reaction between aluminum and water. Further preferably, it is required that when reacted with water, the auxiliary fuel component will not give a reaction product which is detrimental to the use of the evolved gas as a working fluid for driving the turbine and that the fuel component is readily available at a low cost. Usable as the auxiliary fuel component fulfilling such requirement is at least one metal selected from the group consisting of alkali metals and alkaline earth metals. Most preferable examples are sodium, potassium and sodium-potassium alloy. Also usable are lithium and magnesium. The auxiliary fuel component may be finely divided and uniformly admixed with finely divided aluminum or, to increase the output of the fuel per unit volume, a fuel cake may be prepared by uniformly admixing finely divided aluminum with the auxiliary fuel component in molten state and cooling the resulting mixture.

To contact the fuel mixture with water for reaction, the fuel is made into a slurry the liquid phase of which consists singly of the auxiliary fuel component and the slurry is injected through a nozzle into an atmosphere involving the presence of water vapor.

When sodium or potassium is used as the auxiliary fuel component, the fuel must be heated to a temperature not lower than the melting point of the lower-melting metal to melt the metal before injection. Electric means is usable for heating, but more advantageous are the heating means already described in the case of the alloy fuel. When the auxiliary fuel component is a sodium-potassium alloy which is liquid at ordinary temperatures, there is no need to preheat the fuel for injection.

The proportions of finely divided aluminum and the auxiliary fuel components is be admixed therewith to constitute a fuel will be discussed below.

When sodium as the auxiliary fuel component is reacted with water, the resulting heat release is much lower than that achieved by the reaction of aluminum as will be apparent from the comparison of the following two equations:

Na + H$_2$O → ½ Na$_2$O + H$_2$ + 99.4 Kcal

Al + 3/2 H$_2$O → ½ Al$_2$O$_3$ + 3/2 H$_2$ + 199.5 Kcal.

However, since aluminum has greater specific gravity than sodium, it is advantageous to use aluminum in greater proportion in that an increased amount of gas is available per unit volume of the fuel, whereas with the increase of aluminum, the apparent viscosity of the fuel to be injected rises, rendering the fuel difficult to inject and to make into droplets. For this reason, the upper and lower limits of the amount of finely divided aluminum relative to the auxiliary fuel component are so determined that the fuel can be injected and initiated into reaction satisfactorily while permitting the aluminum particles to be uniformly distributed in the molten auxiliary fuel component without being isolated therefrom. The lower limit is about 30%.

When the above fuel mixture is injected in the form of a slurry and brought into contact with water, the auxiliary fuel component such as sodium, potassium or the like contained in the fuel first undergoes the following reaction:

2Na + 2H$_2$O → 2NaOH + H$_2$, or

2K + 2H$_2$O → 2KOH + H$_2$.

Subsequently, the finely divided aluminum contained in the fuel is melted to the reaction temperature by being heated with the resulting heat of reaction and reacts with water as represented by the following equation to evolve a high-temperature high-pressure gas.

2Al$_2$ + 3H$_2$O - - - Al$_2$O$_3$ + 3H$_2$

EXAMPLE 2

The fuel used in this example was a uniform mixture of finely divided aluminum having a mean particle size of 20 microns and sodium in the ratio by weight of 50:50. The fuel was heated to 120° C to prepare a slurry in which sodium only was molten, and the slurry was injected into contact with water through nozzles 0.6 mm in orifice diameter, whereby about 95% of the aluminum contained in the fuel was reacted.

EXAMPLE 3

The fuel used in this example was a uniform mixture of finely divided aluminum having a mean particle size of 20 microns and sodium in the ratio by weight of 80:20 The fuel was brought into contact with water under the same conditions as in Example 2, whereby about 83% of the aluminum contained in the fuel was reacted.

EXAMPLE 4

The fuel used in this example was a uniform mixture of finely divided aluminum having a mean particle size of 20 microns and sodium-potassium alloy in the ratio by weight of 50:50, the alloy being composed of 25% of sodium and 75% of potassium. The fuel was injected at 20° C into contact with water through nozzles, 0.6 mm in the orifice diameter, whereby about 91% of the aluminum contained in the fuel was reacted.

As will be apparent from the foregoing description, the present invention makes it possible to produce a large amount of high-pressure gas by reacting a fuel consisting predominantly of aluminum with water in contact therewith. The invention is therefore especially useful in obtaining propulsive power for self-propelling submarine bodies.

What is claimed is:

1. A method of producing a high pressure hydrogen which comprises the steps of:
    a. injecting into an essentially closed reactor vessel a fuel reactant composition consisting essentially of aluminum as a primary fuel component and at least one metal selected from the group consisting of an alkali metal and an alkaline earth metal alloyed or admixed therewith and serving as an auxiliary fuel component in said fuel reactant composition, and said fuel reactant composition being injected into the reactor through injection nozzles, each measuring 0.3 – 1 mm. in the orifice diameter, in the form of molten droplets and at least 20° C higher, but not more than 200°C higher, than the melting point of said fuel reactant composition, and said fuel reactant composition being introduced from a fuel container pressurized to 5 kg/cm² with argon gas, and the aluminum employed as starting material to form the fuel reactant composition being from 10–20 microns in size;

b. separately injecting water, under pressure, at the same time into the reactor through nozzles each having nearly the same orifice diameter as the fuel injection nozzles to form water vapor in the reactor;

c. vigorously reacting the reactant fuel composition with the water vapor in the reactor to produce a high temperature, high pressure hydrogen and so that at least 90% of the reactant fuel composition is reacted;

d. removing the said high temperature, high pressure hydrogen through an exit port or nozzle.

2. A method as claimed in claim 1 wherein the metal fuel is an alloy of aluminum and one metal selected from the group consisting of lithium and magnesium.

3. A method as claimed in claim 1 wherein the fuel prior to melting is a uniform mixture of finely divided aluminum and at least one alkali metal selected from the group consisting of sodium, potassium, sodium-potassium alloy and lithium, atmosphere containing water vapor.

4. A method as claimed in claim 1 wherein the reaction heat of a heat generating material is used as a heat source for melting the metal fuel, the heat generating material comprising boron and potassium perchlorate admixed therewith.

5. A method as claimed in claim 1 wherein the reaction heat of a heat generating material is used as a heat source for melting the metal fuel, the heat generating material comprising aluminum and a metal oxide.

6. A method as claimed in claim 5 wherein the metal oxide is iron oxide.

7. A method as claimed in claim 5 wherein the metal oxide is copper oxide.

* * * * *